United States Patent
Yoon et al.

(10) Patent No.: US 10,163,145 B2
(45) Date of Patent: Dec. 25, 2018

(54) METHOD AND SYSTEM FOR PROVIDING DISTRIBUTION-TYPE APP STORE SERVICE

(71) Applicant: Samsung Electronics Co., Ltd., Gyeonggi-do (KR)

(72) Inventors: Seok Hyun Yoon, Gyeonggi-do (KR); Ka Ram Ko, Gyeonggi-do (KR); Hae Dong Yeo, Gyeonggi-do (KR); Hyung Dong Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 971 days.

(21) Appl. No.: 14/377,775

(22) PCT Filed: Feb. 8, 2013

(86) PCT No.: PCT/KR2013/001035
§ 371 (c)(1),
(2) Date: Aug. 8, 2014

(87) PCT Pub. No.: WO2013/119076
PCT Pub. Date: Aug. 15, 2013

(65) Prior Publication Data
US 2015/0006328 A1    Jan. 1, 2015

(30) Foreign Application Priority Data

Feb. 8, 2012   (KR) .................. 10-2012-0012853

(51) Int. Cl.
*G06Q 30/06*   (2012.01)
*H04W 4/50*   (2018.01)
(Continued)

(52) U.S. Cl.
CPC ..... *G06Q 30/0629* (2013.01); *G06Q 30/0631* (2013.01); *H04L 67/2838* (2013.01);
(Continued)

(58) Field of Classification Search
None
See application file for complete search history.

(56) References Cited

U.S. PATENT DOCUMENTS

2002/0174000 A1* 11/2002 Katz .................. G06Q 10/04
705/7.42
2008/0077475 A1*  3/2008 McElhiney ........ G06Q 30/0201
705/7.35
(Continued)

FOREIGN PATENT DOCUMENTS

CN       102226916       10/2011
JP       2003-208527      7/2003
(Continued)

OTHER PUBLICATIONS

S. F. Chang, "Application Marketplace as a Service—A Reference Architecture for Application Marketplace Service," 2010 International Conference on P2P, Parallel, Grid, Cloud and Internet Computing, Fukuoka, 2010, pp. 186-192. URL: http://ieeexplore.ieee.org/stamp/stamp.jsp?tp=&arnum (Year: 2010).*
(Continued)

*Primary Examiner* — Kathleen Palavecino
*Assistant Examiner* — Lance Y Cai
(74) *Attorney, Agent, or Firm* — The Farrell Law Firm, P.C.

(57) ABSTRACT

The present invention relates to a method for providing an app store service which implements $3^{rd}$ party-based app stores by using a user's client and links the implemented app stores so as to be distributed by the $3^{rd}$ party, and to a system for the same. The app store service system of the present invention includes: a plurality of app stores established for distribution; a mall integration server to manage the establishment and integrated operation of the plurality of app stores, and integrally analyze metadata collected from the plurality of app stores in order to provide app integration
(Continued)

search and information on the basis of the plurality of app stores; and a client to perform integrated search and browsing for apps on the basis of the mall integration server and the app stores.

19 Claims, 14 Drawing Sheets

(51) Int. Cl.
    *H04W 4/60*     (2018.01)
    *H04L 29/08*     (2006.01)
(52) U.S. Cl.
    CPC .............. *H04W 4/60* (2018.02); *H04L 67/34* (2013.01); *H04W 4/50* (2018.02)

(56) References Cited

U.S. PATENT DOCUMENTS

| | | | | |
|---|---|---|---|---|
| 2010/0262506 | A1* | 10/2010 | Zargahi | G06Q 30/04 705/26.1 |
| 2011/0213678 | A1 | 9/2011 | Chorney | |
| 2011/0250872 | A1* | 10/2011 | Kim | G06F 17/30861 455/414.1 |
| 2013/0232256 | A1* | 9/2013 | Lee | H04W 4/60 709/224 |
| 2014/0095355 | A1* | 4/2014 | Qiu | G06O 30/04 705/26.41 |

FOREIGN PATENT DOCUMENTS

| | | |
|---|---|---|
| KR | 100829356 | 2/2008 |
| KR | 1020090021932 | 3/2009 |
| KR | 100952335 | 5/2009 |
| KR | 102010030280 | 3/2010 |
| KR | 101057016 | 10/2010 |
| KR | 1020110112622 | 10/2011 |
| KR | 1020110113232 | 10/2011 |
| KR | 1020120009834 | 2/2012 |

OTHER PUBLICATIONS

PCT/ISA/237 Written Opinion issued on PCT/KR2013/001035 (pp. 7).
PCT/ISA/210 Search Report issued on PCT/KR2013/001035 (pp. 3).
URL: http://podgate.tistory.com/181 (Appfing, Smart App Surfing), Jul. 21, 2011 (pp. 11).
URL: http//cafe.naver.com/androseries/15 (RNU Cafe, Appfing), Smart App Surfing, Jul. 25, 2011 (1 page).
Korean Office Action dated Dec. 13, 2017 issued in counterpart application No. 10-2012-0012853, 16 pages.
European Search Report dated Mar. 28, 2018 issued in counterpart application No. 13747131.4-1222, 6 pages.
Japanese Office Action dated Jun. 27, 2018 issued in counterpart application No. 10-2012-0012853, 15 pages.

\* cited by examiner

METHOD AND SYSTEM FOR PROVIDING DISTRIBUTION-TYPE APP STORE SERVICE

TECHNICAL FIELD

The present invention relates to a method for providing an application store (hereinafter, referred to as app store) service and a system thereof, and more particularly, to a method for providing an app store service which implements $3^{rd}$ party-based app stores by using a user's client and links the implemented app stores so as to be distributed by the $3^{rd}$ party, and to a system for the same.

BACKGROUND ART

Recently, with the development of digital technology, various user devices capable of processing a communication and personal information while moving, such as a mobile communication terminal, a Personal Digital Assistant (PDA), an electronic notebook, a smart phone, a tablet Personal Computer (PC), and the like, have been released. Due to a rapid technological development, such user devices have been equipped with various functions such as a video call, an electronic notebook, a photographing, an e-mail transmission and reception, a broadcasting play, Internet, a music play, a scheduling, a social network service (SNS), a messenger, a dictionary, a game, and the like, in addition to simple functions of initial technology such as a voice call, and a short message service. The above mentioned functions may be mounted by default at the time of manufacturing a user device. Further, if necessary, a user may download an application of new features through 'mobile contents (software) marketplace' to install additionally.

In addition, recently, the above mentioned online 'mobile contents (software) marketplace' in which users can freely buy and sell a mobile application (e.g., a contents application program mounted on a user device such as a scheduling, an address book, an alarm, a calculator, a game, a video, an internet connection, a music play, a navigation, Word, Excel, and the like) has been invigorated. The mobile contents marketplace is usually called as app store which is an abbreviation for application Store.

The app store is not developed by a certain large company and sold by a mobile service company, but is an open marketplace in which an individual develops and sells an application and everyone can sell their own applications developed by using a program such as a software development kit (SDK) released by an operator company, Xcode, and the like. In addition, when an application created by a private creator is registered in the app store, a consumer (user) may connect to the app store through a wired/wireless communication, and download the application selected by user into a user device, or download into a Personal Computer (PC) and move to the user device.

However, in the current structure of the app store, a subject that operates the app store is a specific business operator. That is, all creators connect a limited specific app store to register the application. In addition, an app store user is able to select only a specific app store according to an app store connection function previously defined in the user device, but cannot select or use various types of app stores. Further, the app store of specific business operator has a slightly closed form depending on the nature of the business operator.

For example, the app store can be divided into a method of exclusively operating an app delivery service by one business operator, and a method of operating an app delivery service by one business operator while permitting an app delivery service of other business operator.

First, the former app store operating method is a method of registering all applications and contents (hereinafter, referred to as app) in an exclusive app store of one business operator to be distributed, and this method does not permit an operation of app delivery service of other business operator or other distribution channel. In addition, since this operation type of app store depends on a policy of specific one business operator, the app can be registered only after a deliberation set by a corresponding app store business operator. Therefore, in case of such an app store, since all creators should connect to one app store, it is inflexible in responding to various app stores. Further, since the structure of the above mentioned app store is implemented not to accept various app stores, there exists a problem of a monopoly for app store service. Further, since the app store user can only use specific one app store provided by a user device, it is impossible to use a certain service such as a price comparison for desired application. In addition, in the case of such an app store, since an excessive operating cost due to a centralized operation and a delay of deliberation/approval due to the centralized operation may occur, an early response for a new app cannot be performed. In addition, a creator should unconditionally follow the policy of specific business operator regardless of the app's characteristic because of a specific business operator based exclusive operation.

Next, the latter app store operating method is a method of directly operating an app delivery service by one business operator similarly to the former app store operating method, but not permitting the app delivery service of other business operator. Therefore, in case of this app store operation method, an app store of a plurality of independent business operators operating the app delivery service has been appeared. However, although this app store operation method is not an exclusive operation method, a limitation of affiliated app store exists, accordingly, it is difficult to approach various app stores. In addition, since each app store is not integrated to operate, user should visit each app store one by one inconveniently, and should search inconveniently app stores selling a corresponding app one by one and compare manually in order to compare an app that user wants to purchase.

DISCLOSURE OF INVENTION

Technical Problem

The present invention may provide a method and a system for providing an app store service capable of operating a user's own app store by escaping from an exclusive app store.

The present invention further provides a method and a system for providing an app store service capable of supporting a $3^{rd}$ party app store by using a user's client.

The present invention further provides a method and a system for providing an app store service capable of providing convenience for app search and information use of user through an integrated operation of a plurality of independent app stores.

Solution to Problem

In accordance with an aspect of the present invention, an app store service method includes: establishing an app store through a mall integration server by a client; determining an operation policy for the established app store; registering an app in the established app store; and synchronizing the registered app and metadata relating to the registered app by transmitting to the mall integration server.

In accordance with another aspect of the present invention, an app store service method includes: inquiring information related to a selection app of user and outputting correspondingly generated integrated app information; comparing the selection app based app stores and outputting comparison information related to the comparison, when an app store comparison from the integrated app information is requested; and connecting to a specific app store selected from the comparison information and downloading the selection app.

In accordance with another aspect of the present invention, there is provided a computer-readable recording medium on which a program for executing the method in a processor is recorded.

In accordance with another aspect of the present invention, an app store service system includes: a plurality of app stores established for distribution; a mall integration server to manage the establishment and integrated operation of the plurality of app stores, and integrally analyze metadata collected from the plurality of app stores in order to provide app integration search and information on the basis of the plurality of app stores; and a client to perform integrated search and browsing for apps on the basis of the mall integration server and the app stores.

Advantageous Effects of Invention

As described above, a method and system for providing a distribution-type app store service according to the present invention may implement a distribution-type app store by 3rd party by escaping from a conventional exclusive app store, and provide convenience for app search and information use of user through an integrated operation of a plurality of independent app stores. This present invention can support a global app store service with a low cost.

According to an embodiment of the present invention, anyone can easily establish an app store.

The present invention can guarantee an independence of establishment and operation of app store when establishing the app store. That is, it is possible to quickly response to a long tail and a local app, and a store identity can be maintained and differentiated through an independent UI and operation policy. The present invention can be operated by various store operators such as a branded store, an app/content creator, and a content retailer. In addition, according to the present invention, a deliberation policy and a price policy suitable for characteristic of each app store can be decided, and thus, a differentiated biz model compared to an existing app store can be introduced.

According to an embodiment of the present invention, consumers can perform an integrated search of various apps sold in a plurality of app stores.

According to the present invention, an app sold in a plurality of distributed app stores of user can be easily searched, and thus, an app store accessibility can be improved.

According to the present invention, user can select an app desired by user freely and broadly by integrally comparing each app store, and accordingly, a high-quality service can be provided through inducement of competition between app stores. According to the present invention, an integrated user's purchase history and personal information can be provided. That is, the present invention may integrally provide a purchase history of user which are distributed for each app store or user information, thereby providing a high-quality personalization and a high-quality app store service Thus, the present invention can implement a plurality of specialized app stores, and an optimal app store service environment that can improve a convenience when user uses an app store service with respect to the distributed app stores, thereby improving the user's usability according to a use of app store, an accessibility, a convenience, and a competitiveness of app store service.

BRIEF DESCRIPTION OF THE DRAWINGS

The objects, features and advantages of the present invention will be more apparent from the following detailed description in conjunction with the accompanying drawings, in which.

MODE FOR THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

This proposed invention relates to a method and a system for providing an application store (hereinafter, referred to as app store) service. Particularly, the present invention relates to a method for providing an app store service which implements $3^{rd}$ party-based app stores by using a user's client and links the implemented app stores so as to be distributed by the 3rd party, and to a system for the same. That is, the present invention relates to a method for a distribution-type app store service which implements a new type of app store service and a system for the same, and enables to distribute various applications and/or contents (hereinafter, referred to as app) through a distributed $3^{rd}$ party app stores and a system for the same.

Hereinafter, a configuration and an operation control method of a system according to an embodiment of the present invention are described with reference to the accompanying drawings in detail.

Figure 1:
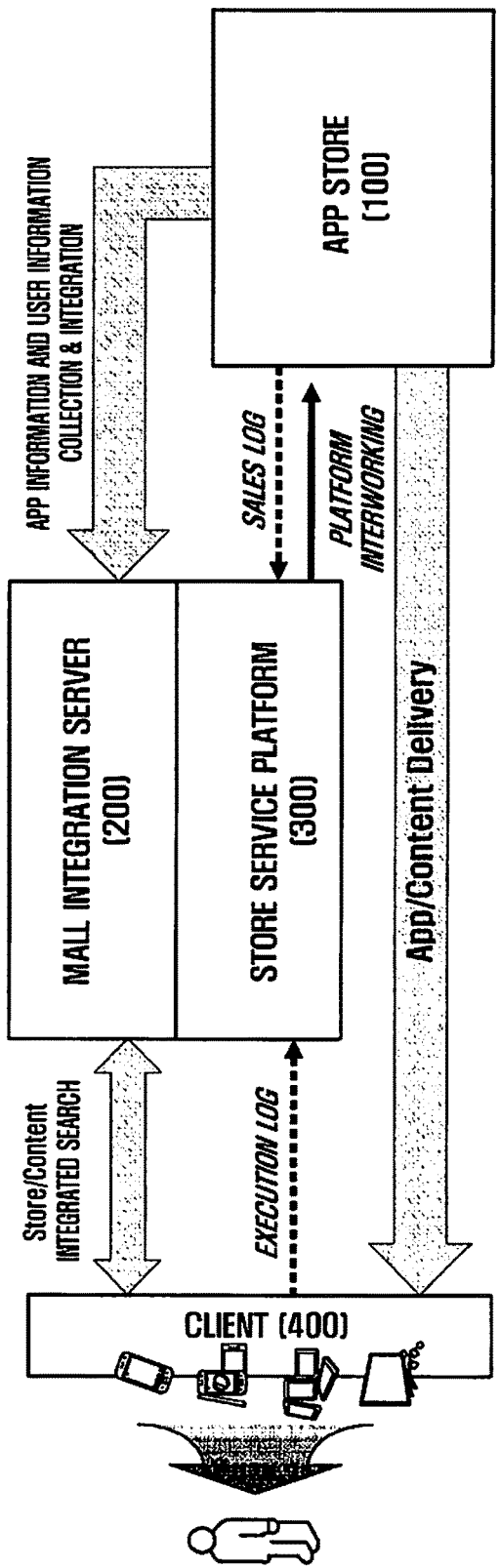
FIG. 1 is a diagram illustrating a configuration of a system for supporting an app store service according to an embodiment of the present invention.

FIG. 1 is a diagram illustrating a configuration of a system for supporting an app store service according to an embodiment of the present invention.

Referring to FIG. 1, an app store service system of the present invention is configured to include an app store 100, a mall integration server 200, a store service platform 300, and a client 400.

The app store 100 may indicate a store server that can register and sell an app, and may be configured with one or more. In the present invention, the app store 100 may be operated plurally by a plurality of third parties. This app store 100 may be operated by an installation method of providing an install package that can be installed in an existing server and a personal computer (PC), a joining method of establishing and providing a basic infrastructure necessary for an operation of app store in the mall integration server 200 when requesting an establishment after joining in the mall integration server 200 on-line, and an affiliation method of interworking with an existing app store to be linked with the mall integration server 200. In this case, the affiliation method may be provided by at least one of a method of adding a store adaptor which can be interworked with the mall integration server 200 into the existing app store, or a method of integrating through a store crawler that can collect an app of the existing app store, purchasing, evaluation information from the mall integration server 200. Each operation method of such app store 100 will be described later.

In the present invention, the app store 100 may guarantee autonomy so that the app store establisher may freely decide a user interface (UI), a deliberation policy, a rate of profit distribution, and a recommendation policy. In addition, the app store 100 may mutually synchronize and share one or more of metadata, such as an app, app information, user information, sales information, and evaluation information, with the mall integration server 200 on the basis of an open application programmer interface (API). Here, the above mentioned synchronization may indicate a process of determining the same app of the same app seller to integrate relevant information (i.e., metadata) between the app store 100 and the mall integration server 200. In the present invention, the app store 100 may further include an ad module to store and provide an ad for the app to be sold. In addition, when receiving an ad of other app store from the mall integration server 200, the app store 100 may move the app which is on sale in its own app store to app information within its own app store and handle the ad. The operation method of such app store 100 and its configuration will be described later.

The mall integration server 200 may collect metadata such as app, app information, user information, and purchase information from the app store 100 to manage and provide the collected metadata integrally. The mall integration server 200 may provide a search and inquiry for the app store 100, and a search and inquiry for the app, and may support a store comparison service such as sales information including a sale price comparison. The mall integration server 200 may support the store comparison service based on integrated statistics information provided from the store service platform 300. Here, when providing the store comparison service, the mall integration server 200 may perform a comparison for each app store 100 on the basis of integrated statistics information including the number of user for each of a plurality of app stores 100, sales performance, evaluation, and the like. In addition, the mall integration server 200 may provide a screen interface that intuitively visualizes the integrated statistics information.

Further, the mall integration server 200 may mutually synchronize and share one or more of metadata, such as an app, app information, user information, sales information, and evaluation information, with the app store 100 on the basis of an open application programmer interface (API). Here, the above mentioned synchronization may indicate a process of determining the same app of the same app seller to integrate relevant information (i.e., metadata) between the mall integration server 200 and the app store 100. In the present invention, the mall integration server 200 may further include an ad integration module to integrate and store a store ad for each of the app store 100 and an app ad and provide the integrated ad to each of other app store 100 to share. The operation method of such mall integration server 200 and its configuration will be described later.

In the meantime, according to the embodiment of the present invention, the app seller may integrally register the same app in one or more app stores 100 through the mall integration server 200 which is a single representative server. Then, the mall integration server 200 may register automatically in all of the plurality of the app stores 100 or may register automatically in at least one optional app store of the seller, with respect to the app that the seller requests to register based on the seller client 400. In this case, the mall integration server 200 may recommend the app store 100 most suitable to register and sell a corresponding app to the seller. For example, when recommending the app store 100 for registering and selling an app, the mall integration server 200 may recommend the app store 100 in order of a high expected earnings of registration app that the seller desires to register based on the sales performance of the app store 100, may recommend the app store 100 in order of a high suitability of existing sales app and registration app of each app store 100, may recommend the app store 100 in order of a high suitability of preference of existing users and registration app of each app store 100, or may integrally recommend the app store 100 by using a combination of those recommendation methods to rank the app store 100.

The store service platform 300 may perform an integrated statistics and analysis from log information of a plurality of app stores 100 to provide additional information to each app store 100. That is, the store service platform 300 may integrally analyze information collected from each app store 100, and then provide again to each app store 100. In detail, the store service platform 300 may generate integrated statistics information on the basis of metadata such as an app of entire app store 100 collected through the mall integration server 200, app information, user information, sales information, evaluation information, and the like, and integrally analyze the integrated statistics information to provide additional information to the app store 100 and the mall integration server 200. In this case, the store service platform 300 may provide at least one additional service of statistics information of approval/rejection status in an entire app store 100, entire user evaluation information for an app, recommendation information of all app stores 100 that sell the same app, or popular trend information of all users. Here, in the present invention, the store service platform 300 is an optional element, and some or all of the elements may be provided through the mall integration server 200, and in this case, the store service platform 300 may be omitted from the configuration of the present invention.

The client 400 indicates a user device to search and inquire and purchase a product of the app store 100 or the mall integration server 200. That is, the client 400 indicates a user device to integrally search and brows an app from among the app store 100 or the mall integration server 200. Then, the client 400 may output a screen interface that visualizes integrated statistics information such as the number of users for each app store 100 provided based on a store comparison service of the mall integration server 200, a sales performance, and an evaluation. Then, the client 400 may be used as a device to establish the above mentioned app store 100 according to the type of a corresponding client, or a device to register and sell an app through the app store 100 and the mall integration server 200. For example, a user may establish the app store 100 by using a personal computer.

The client 400 may include all information communication devices supporting a function of the present invention, a multimedia device, and an application device thereof. For example, the user device may include devices such as a tablet personal computer (PC), a smart phone, a digital camera, a portable multimedia player (PMP), a media player, a mobile game terminal, a portable computer, a desktop computer, and a personal digital assistant (PDA), as well as a mobile communication terminal operated based on each communication protocols corresponding to various communication systems.

Figure 2:
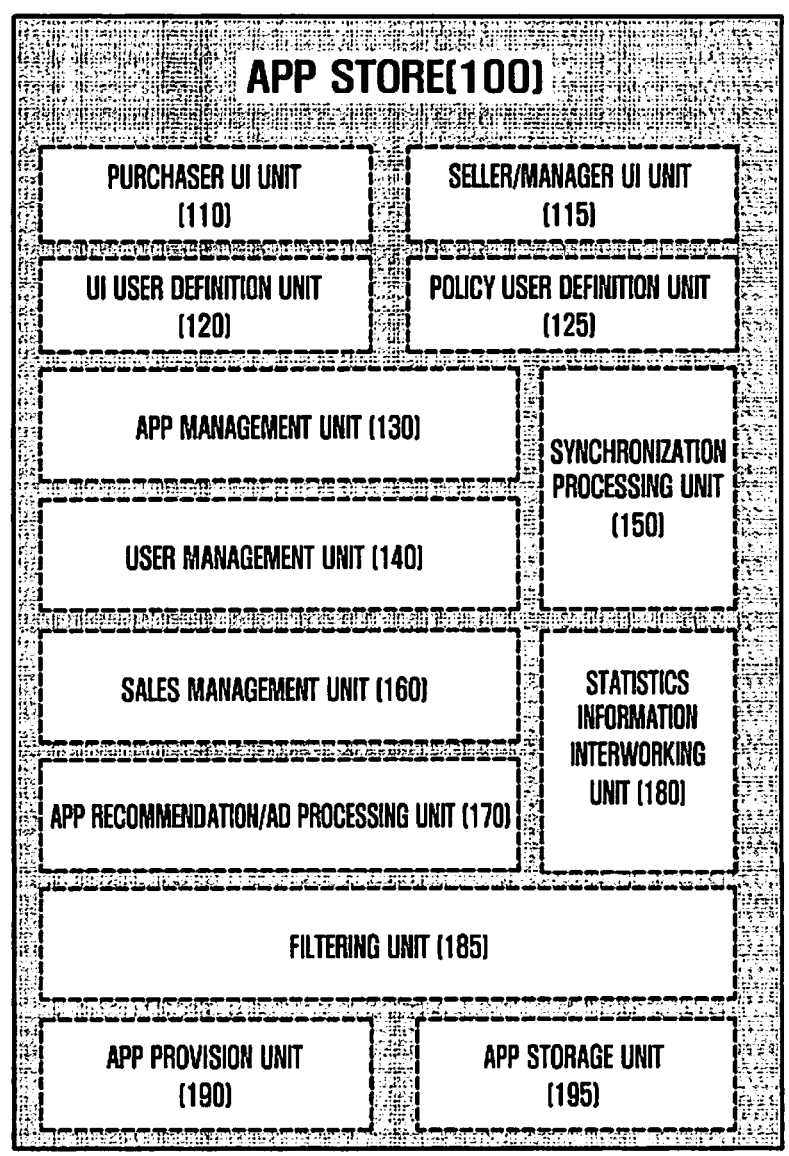
FIG. 2 is a diagram illustrating a configuration of an app store according to an embodiment of the present invention.

FIG. 2 is a diagram illustrating a configuration of an app store according to an embodiment of the present invention.

Referring to FIG. 2, the app store 100 of the present invention may include a purchaser UI unit 110, a seller/manager UI unit 115, a UI user definition unit 120, a policy user definition unit 125, an app management unit 130, a user management unit 140, a synchronization processing unit 150, a sales management unit 160, an app recommendation/ad processing unit 170, a statistics information interworking unit 180, a filtering unit 185, an app provision unit 190, and an app storage unit 195.

The purchaser UI unit 110 indicates a module to provide a screen interface that can actually search and query an app in the client 400. The purchaser UI unit 110 may provide the screen interface in various forms such as a native client or a mobile web according to a platform of the client 400. Here, the native client indicates a software to help create a program directly linked to each operating system (OS) of the client 400.

The seller/manager UI unit 115 indicates a module to provide a UI that a seller can register so as to sell an app. The seller/manager UI unit 115 may provide the screen interface so as to access through a personal computer using a wired communication as well as a mobile device using a wireless communication according to the type of the client 400. At this time, the seller/manager UI unit 115 may provide the screen interface through a web page so that each seller may support a connection by using a web browser and an app registration by using a web browser.

The UI user definition unit 120 indicates a module to enable an operator (establisher, seller, user) operating the app store 100 to easily modify and differentiate the screen interface of his own app store 100. That is, the operator operating the app store 100 may configure his own screen interface, and the UI user definition unit 120 may support a user based screen interface manufacturing function.

The policy user definition unit 125 indicates a module to enable the operator to freely decide an operation policy of the app store 100. Here, the policy that each operator of app store 100 can modify may include an app recommendation method, an app recommendation list, a commission rate, and a deliberation policy, and the like.

The app management unit 130 indicates a module to manage an app registered by an operator of app store 100 or an app seller. The app management unit 130 may provide a browsing based on a category for the registered app, or provide a full text search, or the like.

The user management unit 140 indicates a module to manage a user using the app store 100, and in particular, indicates a module to handle a personal information management such as a member joining of a user (or a seller), a user authentication for a user (or a seller) joining a membership, a personal purchase list for each user, and a sales app list for each seller, and the like.

The sales management unit 160 indicates a module to manage a sales approval of app according to a deliberation result determined by the operator in the app store 100, and manage a sales performance and statistics of app.

The app recommendation/ad processing unit 170 indicates a module to recommend an app to a user, or process an ad for a specific app. Here, the app store 100 may separately operate an ad processing unit, so that the app store 100 may store and provide an ad for a sales app. At this time, the app store 100 may move the ad of the app identical with the app which is on sale in the app store 100 among the ad of other app store provided from the mall integration server 200 to app information managed by its own app store to process the ad integrally based on the ad processing unit, so that repetitious ads can be excluded.

The synchronization processing unit 150 indicates a module to transmit metadata such as app information registered in the app store 100, user information, purchase and evaluation information, and the like to the mall integration server 200. That is, the synchronization processing unit 150 may process a synchronization procedure of determining the same app of the same app seller between the app store 100 and the mall integration server 200 to integrate relevant information (i.e., metadata), and sharing the integrated relevant information with the mall integration server 200.

The statistics information interworking unit 180 indicates a module to receive additory additional information (e.g., integrated statistics information) from the mall integration server 200 or the store service platform 300.

The filtering unit 185 indicates a module for a client 400 based information filtering. The filtering unit 185 indicates a module for a filtering to provide an app recommendation and a recommendation list to the client 400, based on client information such as a type of platform of the client 400 connected to the app store 100, a type of app installed in the client 400, and an app list, and the like. The filtering unit 185 may detect the platform of the connected client 400, and may perform a filtering to provide an app which can be installed and available in the client 400 according to the platform of the detected client 400. In this case, the filtering unit 185 may remove an app previously installed in the client 400 from a recommendation list, and may identify version information of the app previously installed in the client 400 to process an update notification, or the like.

Here, an agent app provided through the app store 100 can be installed in the client 400 in order to query the client information (e.g., an app list installed in the client 400, etc.) of the client 400 connected to the app store 100 in the filtering unit 185 of the app store 100.

For example, the app store 100 may provide the agent app to the connected client 400, and the client 400 may download and install the agent app provided by the app store 100. In addition, the user of the client 400 may set an address of a server (e.g., app store 100 or mall integration server 400) to which the client information (e.g., an app list of apps installed in the client 400, or the like) of the client 400 is transmitted and a period (e.g., second unit, minute unit, hour unit, or the like) of transmitting the client information to the server (e.g., app store 100 or mall integration server 400) through the agent app.

In addition, when user completes a setting as described above, the client 400 may periodically transmit the client 400's own app list to the set server according to a set period. In addition, when connecting to the app store 100 (or mall integration server 200), the client 400 may transmit its own app list to the app store 100 (or mall integration server 200). Then, the app store 100 (or mall integration server 200), may perform the above mentioned filtering based on the client information of the client 400 through the filtering unit 185.

The app provision unit 190 indicates a module to transmit an app in accordance with a user selection to the user. At this time, the app provision unit 190 may transmit an app to the user's client 400 through a network transmission protocol such as Hyper Text Transfer Protocol (HTTP)/HTTP over Secure Sockets Layer (HTTPS), or the like.

The app storage unit 195 indicates a module to store and manage metadata including an app which is on sale in the app store 100. The app storage unit 195 may be configured by at least one of recording media such as a local disk, a network disk, or a cloud storage.

Figure 3:
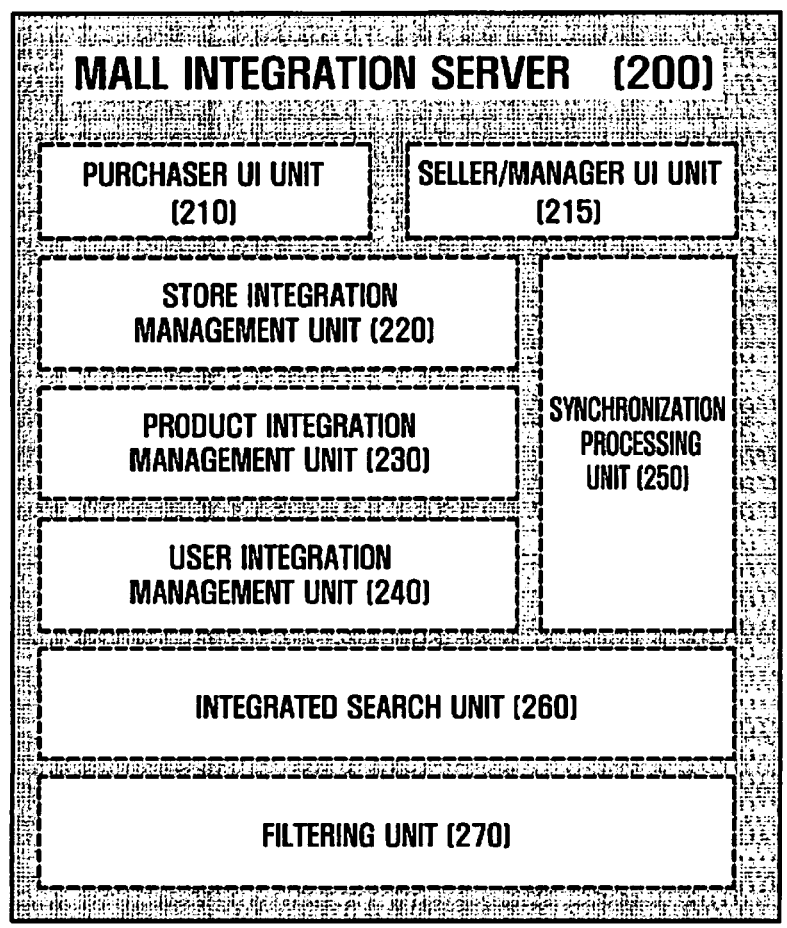
FIG. 3 is a diagram illustrating a schematic configuration of a mall integration server according to an embodiment of the present invention.

FIG. 3 is a diagram illustrating a schematic configuration of a mall integration server according to an embodiment of the present invention.

Referring to FIG. 3, the mall integration server 200 of the present invention may include a purchaser UI unit 210, a seller/manager UI unit 215, a store integration management unit 220, a product integration management unit 230, a user integration management unit 240, a synchronization processing unit 250, an integrated search unit 260, and a filtering unit 270.

The purchaser UI unit 210 indicates a module to provide a screen module for supporting to search and query an available app store 100 in the client 400 as well as an actual app. The purchaser UI unit 210 may provide the screen interface in various forms, such as a native client or a mobile web, or the like, according to the platform of the client 400.

The seller/manager UI unit 215 indicates a module to selectively provide an integrated seller screen interface to integrally manage the sales performance or status of the seller who sells an app in one or more app stores 100 as well as a screen interface that can manage the registered app store 100 or apps. Here, the seller/manager UI unit 215 may provide a screen interface to access through a personal computer, or the like using a wired communication as well as a mobile device using a wireless communication according to the type of the client 400. At this time, the seller/manager UI unit 215 may provide the screen interface through a web page so that each seller may support a connection and app registration using a web browser.

The store integration management unit 220 indicates a module to integrally manage all established app store 100.

The product integration management unit 230 indicates a module to integrally manage apps which are on sale in all app stores 100.

The user integration management unit 240 indicates a module to integrally manage users who registered in the app store 100.

The synchronization processing unit 250 indicates a module to receive metadata such as an app registered in the app store 100, app information, user information, purchase information, and evaluation information, and the like and integrally store the received metadata. Here, when the same app is distributed in a plurality of app stores 100, the synchronization processing unit 250 may selectively include a function of detecting the distributed same app as a single app.

The integrated search unit 260 indicates a module to collect all apps sold in the app stores 100 to support an integrated search, and provide a search function for entire app store 100 and full users. In addition, when the same app is sold in a plurality of app stores 100, the integrated search unit 260 may additionally provide price comparison information for each app store of corresponding app. That is, the integrated search unit 260 may provide a store comparison service for app stores selling the same app.

The filtering unit 270 indicates a module for a client 400 based information filtering. The filtering unit 270 indicates a module to perform a filtering to provide an app recommendation and a recommendation list to the client 400, based on client information such as a type of platform of a client 400 connected to the app store 100, a type of an app installed in the client 400, an app list, and the like. The filtering unit 270 may perform a filtering to detect the platform of the connected client 400, and provide an installable and available app to the client 400 according to the platform of the detected client 400. In this case, the filtering unit 270 may remove an app which is previously installed in the client 400 from a recommendation list, and may determine version information of the app which is previously installed in the client 400 to process an update notification, or the like.

Here, an agent app provided by the mall integration server 200 may be installed in the client 400 so that the filtering unit 270 of the mall integration server 200 may query client information (e.g., an app list installed in client 400, etc.) of the client 400 connected to the mall integration server 200. This operation explanation may correspond to the above mentioned description of the filtering unit 185 of the app store 100.

Figure 4:
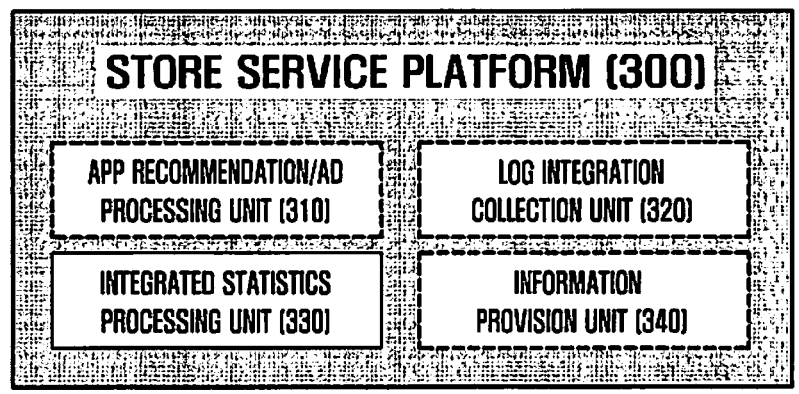
FIG. 4 is a diagram illustrating a schematic configuration of a store service platform according to an embodiment of the present invention.

FIG. 4 is a diagram illustrating a schematic configuration of a store service platform according to an embodiment of the present invention.

Referring to FIG. 4, a store service platform 300 of the present invention may include an app recommendation/ad processing unit 310, a log integration collection unit 320, an integrated statistics processing unit 330, and an information provision unit 340. The log integration collection unit 320 indicates a module to collect a log of user related to an app inquiry, a purchase, an evaluation, and a feedback, etc, from all app stores 100. The integrated statistics processing unit 330 indicates a module to integrate the log of user collected by the log integration collection unit 320, and process various statistics through an integrated log of user.

The app recommendation/ad processing unit 310 indicates a module to recommend (personalized app recommendation, related app recommendation, popular app recommendation, etc) an app from the log of user collected by the log integration collection unit 320, and provide a relevant ad. When recommending the app, the app recommendation/ad processing unit 310 may recommend an app according to a recommendation method of at least one of a personalized app, a related app, or a popular app, according to a log for each user.

The information provision unit 340 indicates a module to provide various information, such as statistics information created through an analysis of a log for each user, recommendation information, ad information, and the like, to the app store 100.

In the meantime, the above described app store service providing system of the present invention may implement an app store 100 by one or more of various types as shown in following FIGS. 5 to 8. That is, according to an embodiment of the present invention, as shown in FIGS. 5 to 8, according to an implementation type of the app store 100, the app store 100 may be implemented as an installation type store, a joining type store, and an affiliation type store. Hereinafter, each case of implementing the app store 100 of the present invention as the installation type store, the joining type store, and the affiliation type store is described with reference to FIGS. 5 to 8.

Figure 5:
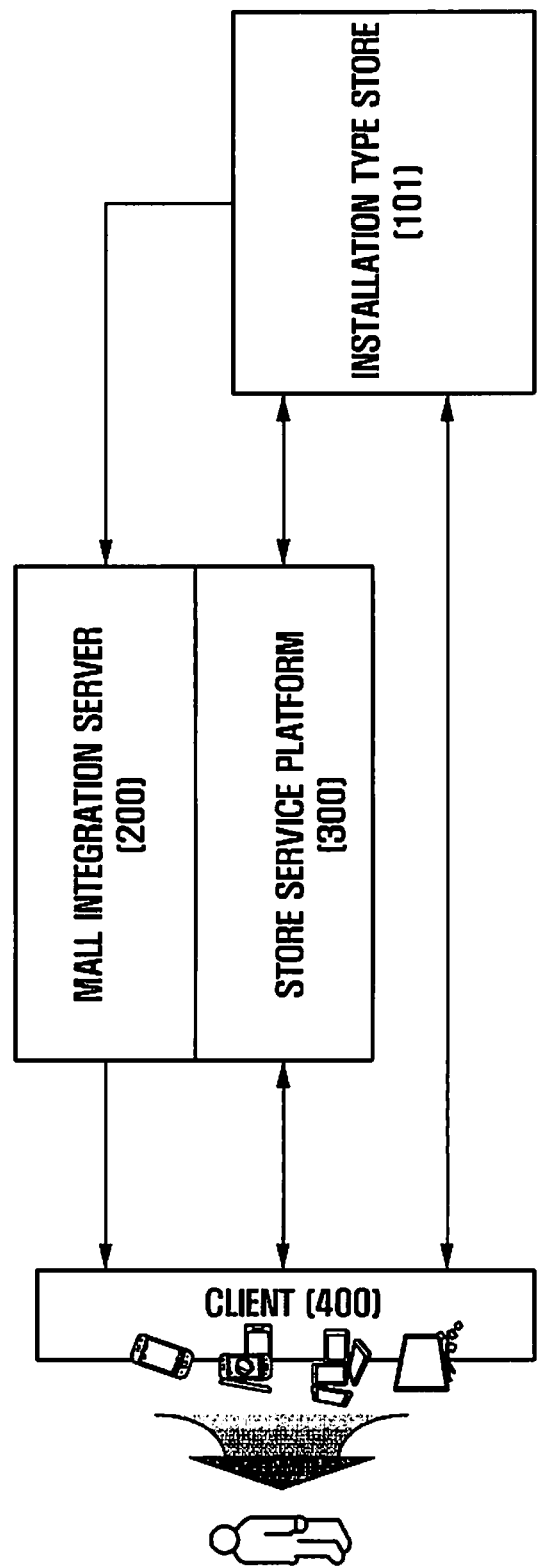
FIGS. 5 to 8 are diagrams illustrating various forms of an example of implementing an app store according to an embodiment of the present invention.

FIG. 5 is a diagram illustrating an example of implementing an app store 100 according to an embodiment of the present invention.

As shown in FIG. 5, FIG. 5 illustrates an example of an app store service system that implements the app store 100 as an installation type store 101. In this case, a basic configuration of the app store service system establishing an installation type store 101 may correspond to a configuration of the above mentioned app store service system of FIG. 1, but there is a difference in that the app store 100 is implemented as the installation type store 101. Accordingly, hereinafter, the description of the mall integration server 200, the store service platform 300, and the client 400 among configurations shown in FIG. 5 is omitted. In addition, in FIG. 5, for the convenience of description, the installation type store 101 was separately illustrated, but the installation type store 101 may correspond to the above described app store 100.

Referring to FIG. 5, any user may implement the installation type store 101 through an infrastructure such as a previously implemented server (commodity server) or a personal computer. In particular, the installation type store 101 may be established by any user by using an installation type store package for establishing the installation type store 101 provided by the mall integration server 200. That is, the installation type store package may be provided to various third-parties through the mall integration server 200. Accordingly, each third party that desires to individually operate an independent app store 100 may download and install the installation type store package through the mall integration server 200 into a previously possessed infrastructure (a possessed server or a possessed personal computer, etc.), thereby operating its own app store 100.

In this case, when each infrastructure of the remotely distributed third party downloads and installs the installation type store package from the mall integration server 200 in order to establish the app store 100, i.e., the installation type store 101, the mall integration server 200 may perform an establishment process of the app store 100 (i.e., installation type store 101) for the installation type stores 101 of respective third parties. Here, the infrastructure (i.e., a server or a personal computer, etc.) of the installed app store 100 for distribution and the mall integration server 200 may be interworked mutually through a standardized open API. Here, each third party for establishing the installation type store 101 requires a separate configuration such as a Contents Delivery Network (CDN). However, an existing possessed infrastructure (server, personal computer, etc.) may be utilized, and, if a competitive infrastructure is possessed, a differentiation may be provided through such competitive infrastructure.

Figure 6:
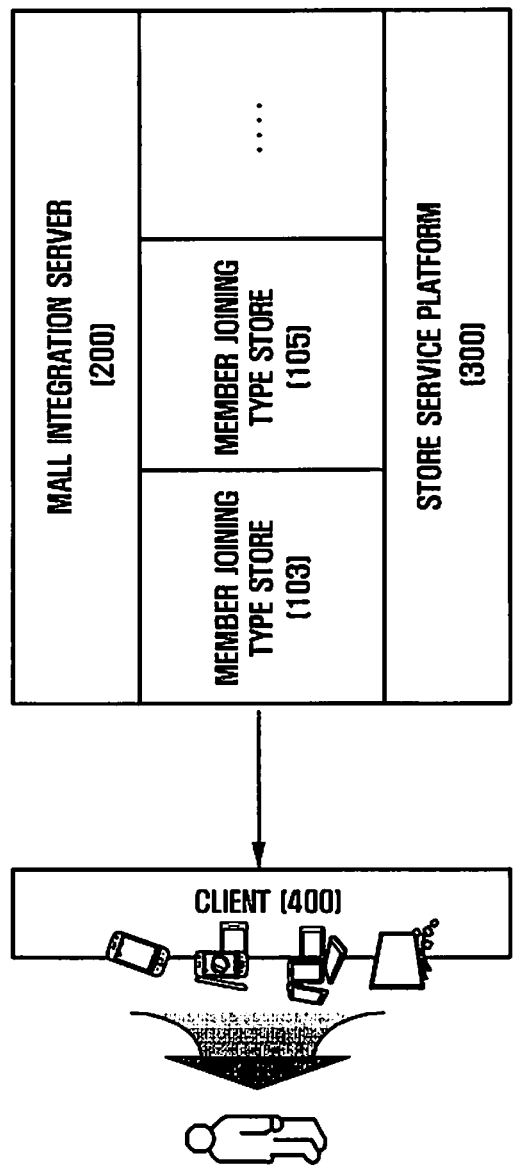

FIG. 6 is a diagram illustrating an example of implementing an app store 100 according to an embodiment of the present invention.

As shown in FIG. 6, FIG. 6 illustrates an example of an app store service system that implements the app store 100 as a joining type store 103 and 105. In this case, a basic configuration of the app store service system establishing a joining type store 103 and 105 may correspond to a configuration of the above mentioned app store service system of FIG. 1, but there is a difference in that the app store 100 is implemented as the joining type store 103 and 105. Accordingly, hereinafter, the description of the mall integration server 200, the store service platform 300, and the client 400 among configurations shown in FIG. 6 is omitted. In addition, in FIG. 6, for the convenience of description, the joining type store 103 and 105 was separately illustrated, but the joining type store 103 and 105 may correspond to the above described app store 100.

Referring to FIG. 6, first, the mall integration server 200 may simultaneously operate the app store 100, in addition to the above described function operation of the mall integration server 200. That is, a third party that desires to operate the app store 100 individually may join the mall integration server 200, and request an establishment of the app store 100. Then, the mall integration server 200 may establish and provide the app store 100 of the third party within the mall integration server 200, in response to a joining according to the establishment of the app store 100 of the third party and its request. That is, each third party may establish the app store 100, i.e., the joining type store 103 and 105, by joining the mall integration server 200 to use the infrastructure provided by the mall integration server 200 just as it is. Here, each third party for establishing the joining type store 103 and 105 may not require a separate infrastructure such as a server, a personal computer, CDN, or the like, but may establish its own app store 100 more easily.

Figure 7:
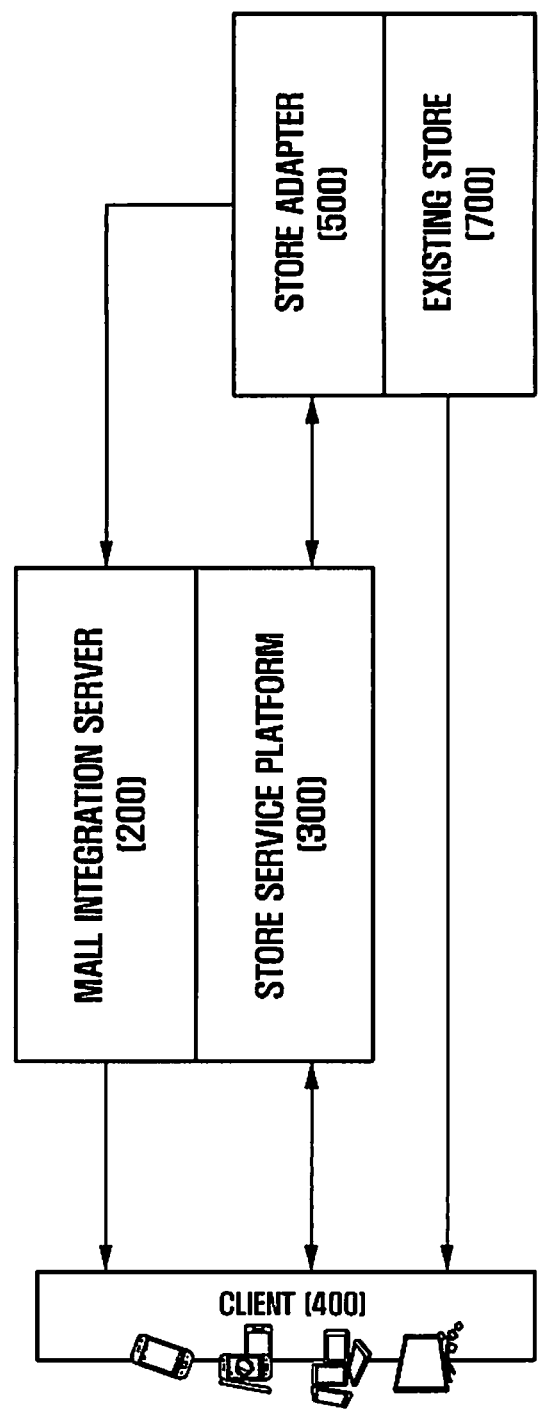
Figure 8:
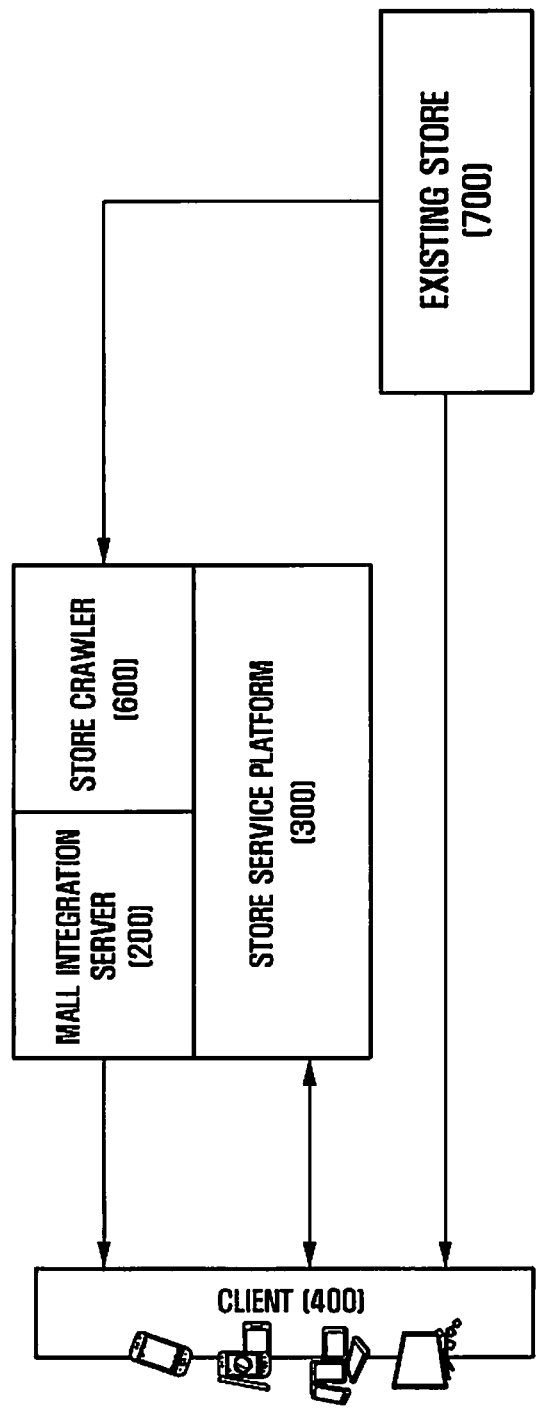

FIGS. 7 and 8 are diagrams illustrating another example of implementing an app store 100 according to an embodiment of the present invention.

As shown in FIGS. 7 and 8, FIGS. 7 and 8 illustrate an example of an app store service system that implements the app store 100 as an affiliation type store by affiliating with existing app stores (existing store 700). In this case, a basic configuration of the app store service system establishing an affiliation type store may correspond to a configuration of the above mentioned app store service system, but there is a difference in that the app store 100 is implemented by an existing store 700, and a store adapter 500 and a store crawler 600 may be additionally configured depending on an affiliation type of the existing store 700. Accordingly, hereinafter, the description of the mall integration server 200, the store service platform 300, and the client 400 among configurations shown in FIGS. 7 and 8 is omitted. In addition, in FIGS. 7 and 8, for the convenience of description, the existing store 700 was separately illustrated, but the existing store 700 may correspond to the above described app store 100.

Referring to FIG. 7, FIG. 7 illustrates an example of operating the existing store 700 like the app store 100 based on an interworking with the store adapter 500. In the present invention, the store adapter 500 may indicate a data synchronization gateway to extract a metadata of the existing store 700 and convert the extracted metadata in a uniform format in order to ensure an interoperability between the mall integration server 200 and the existing store 700. According to such an establishment method of the app store 100, a third party who operates the existing store 700 may participate as a distributed app store 100 of the present invention, without an establishment of a separate additional infrastructure or additional app store. In this case, the existing store 700 may migrate to the mall integration server 200 by adding the store adapter 500 that can be interworked with the mall integration server 200 based on an open API to an app store in operation. That is, the operation environment of the existing store 700 may be moved to a better operation environment by an affiliation with the mall integration server 200.

Referring to FIG. 8, FIG. 8 illustrates an example of operating the existing store 700 like the app store 100 based on an interworking with the store crawler 600. In the present invention, the store crawler 600 may indicate module to crawl the existing app stores (existing store 700). That is, the store crawler 600 may trace the existing store 700 which exists on a network to collect necessary information, and provide the collected information of the existing store 700 to the mall integration server 200. That is, the mall integration server 200 may be affiliated by crawling the metadata of the already operated existing store 700 through the store crawler 600.

In the meantime, as described in FIGS. 5 and 8, the app store 100 of the present invention may be configured with a distribution type app store by one of an installation type store, a joining type store, and an affiliation type store, or a combination thereof. Hereinafter, the operation method using the above mentioned app store service system of the present invention is illustrated.

Figure 9:
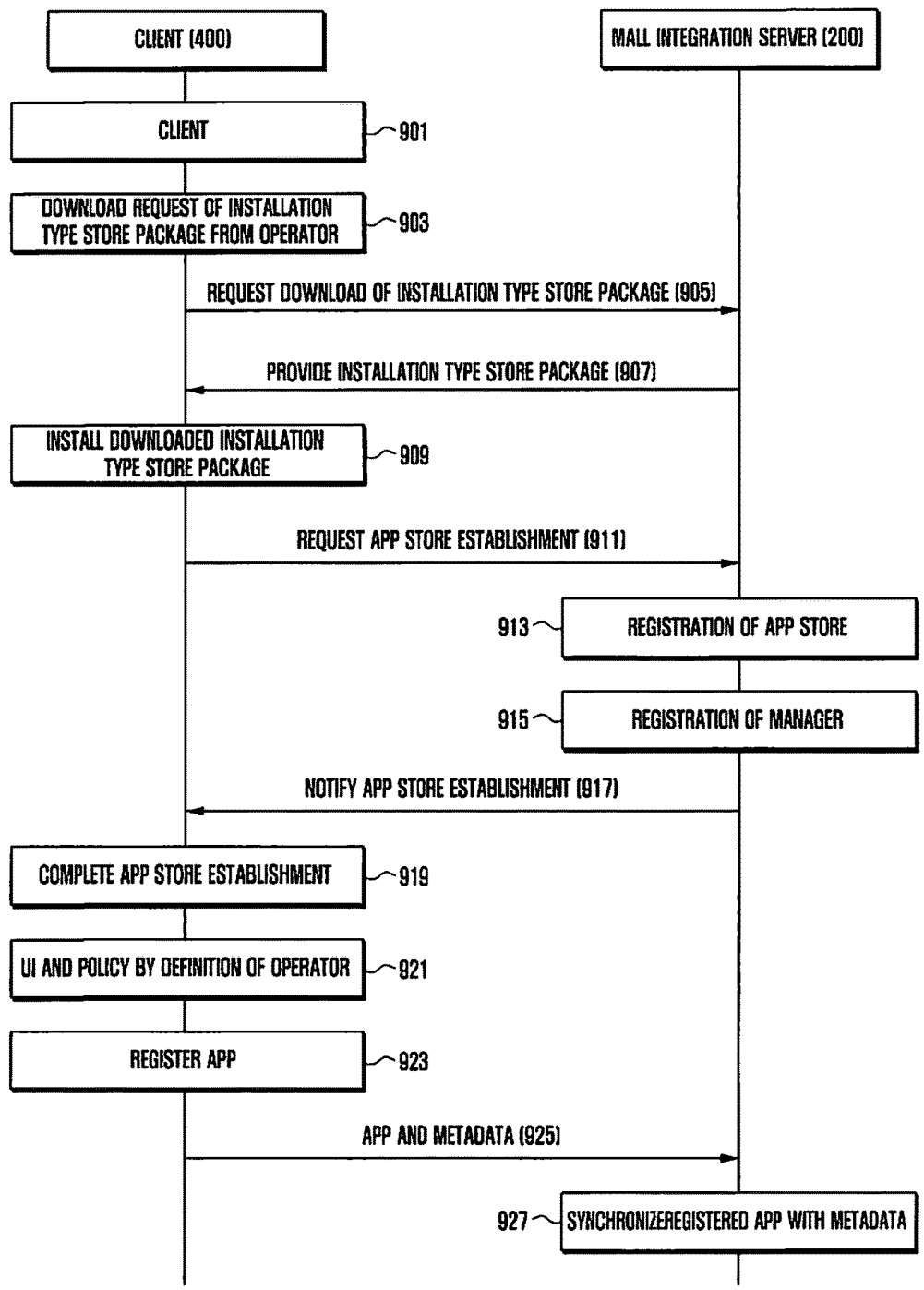
FIG. 9 is a flowchart illustrating an app store establishment operation for an app store service according to an embodiment of the present invention.

FIG. 9 is a flowchart illustrating a method of providing an app store service according to an embodiment of the present invention.

In particular, FIG. 9 illustrates an operation of establishing the app store 100 by an operator who operates the app store. At this time, FIG. 9 illustrates an operation of establishing the app store 100 on the basis of the above mentioned installation type store.

Referring to FIG. 9, an operator who desires to establish the app store 100 may connect to the mall integration server 200 by using his own client 400 and may begin to establish the app store 100 after member joining at step 901. At this time, the client 400 may correspond to a personal computer or a server that has a performance to establish an app store.

Next, the client 400 may request a download of an installation type store package for an app store installation to the mall integration server 200 at step 905, in response to the download request (step 903) of installation type store package of the operator. That is, a subject (an operator or a manager) who desires to operate an app store may download a file of the installation type store package provided by the mall integration server 200 by using the client 400 such as an already possessed personal computer or server.

Next, the mall integration server 200 may provide the installation type store package to the client 400, in response to the download request of installation type store package of the client 400 at step 907. At this time, the mall integration server 200 may confirm an authentication for the client 400, i.e., a membership joining for the operator and a corresponding user authentication.

Next, the client 400 may install the downloaded installation type store package, when downloading the installation type store package from the mall integration server 200 at step 909. That is, the operator may install the downloaded installation type store package into the client 400 such as a personal computer or a server.

Then, the client 400 may request an app store establishment to the mall integration server 200, when completing an installation by using the installation type store package at step 911. At this time, the operator may input basic app store information and operator information after executing the installed store package, and may request the app store establishment. Then, the client 400 may transmit the app store information and the operator information input by the operator to the mall integration server 200 and request the app store establishment. For example, when the installation of the app store 100 using the installation type store package is completed, a screen interface to which log information (e.g., ID and password) and basic information necessary for the operation of the app store 100 may be input may be provided. Then, the operator may input the log information and the basic information through the given interface, and may request the app store establishment to the mall integration server 200.

Next, when receiving the request of app store establishment from the client 400, the mall integration server 200 may perform the registration of the app store 100 (step 913) and the registration of the manager (operator) (step 915) based on the app store information and the operator information that are transmitted together with the request of app store establishment. That is, when receiving the request of app store establishment, the mall integration server 200 may register a new app store 100 on the basis of the client 400 with reference to the app store information and the operator information that are transmitted together with the request of app store establishment, and may register a manager for the registered app store 100 as the operator. Then, when completing the registration of the app store 100 and the manager in accordance with the request of the client 400, the mall integration server 200 may notify a corresponding completion of app store establishment to the client 400 at step 917.

Next, when the completion of app store establishment is notified from the mall integration server 200, the client 400 may complete a procedure of app store establishment in response to the notification at step 919. That is, when the registration of the app store 100 and the manager is completed, the mall integration server 200 may send the result of the registration to the client 400 that requested the app store establishment, and, correspondingly, the client 400 may complete the establishment of the app store.

Next, when the requested app store is established through the mall integration server 200, the client 400 may configure a screen interface UI and a policy for providing an app and a relevant metadata according to a definition of operator at step 921. For example, when the establishment of the app store is completed, the operator may edit and establish the UI and the policy to be adjusted to his own operation policy through a manager UI. Then, the client 400 may define the UI and the policy according to the edition and the establishment of the operator to register and manage.

Next, the client 400 may register an app and a metadata relating to the app in the established app store 100 as described above at step 923. For example, when the app store is established to operate, sellers may register an app (including a metadata relating to the app) for sale through a seller UI after joining the established app store 100. In particular, when registering the app for sale, the seller may perform a procedure of specifying a platform (e.g., an Operating System (OS) of the client 400 and its version information, and the like) of the client 400 that can support the app, and registering support app files for each platform.

For example, the seller who has a seller authority in the app store 100 may connect to the app store 100 by using his own client 400. Further, after going through a certain user authentication, the seller may register the app for sale and the metadata relating to the app based on the seller UI provided from the app store 100. At this time, the seller may additionally input information related to the app for registration through the seller UI, and the information related to the app may be briefly divided into basic information, additional information, and a platform. The basic information may include a name of app, a sale price, seller information, contact information, and a category and type of app, and the like. The additional information may include tags, a detailed explanation, a supported language, an icon, a preview image, and the like. The platform may include a type of operating system supported by the app, and version information for each supported operating system, and the like.

In addition, when the app store 100 is established, it is obvious that the operator of the app store 100 may register his own app (including a metadata relating to the app) for sale.

Next, when the app is registered as described above, the client 400 may transmit the registered app and the metadata relating to the registered app to the mall integration server 200 (step 925) to synchronize the app with the metadata at step 927. That is, the client 400 may transmit the app registered in the app store 100 and the metadata relating to the registered app to the mall integration server 200 at step 925, and the mall integration server 200 may receive the app transmitted from the client 400 and the metadata relating to the registered app to synchronize the app with the metadata at step 927. At this time, the synchronization may be performed with respect to the app and the relevant metadata when a specific app is registered for the first time, and then, a corresponding metadata may be synchronized with respect to a user evaluation for the specific app, and a purchasing history.

In the meantime, although not shown and illustrated in FIG. 9, the embodiment of the present invention may support the initialization of the setting environment of the established app store 100. For example, the app store 100 operator may initialize the environment setting of the app store 100 in operation in the case of relocating the store package of the app store 100 in operation to other infrastructure (e.g., a personal computer or a server, etc.), or changing the information of the app store 100 in operation, or the like. At this time, the above mentioned initialization may correspond to an initialization in view of the operator. In this case, the data, such as seller information registered in the app store 100, a registered app of sellers, and information of joined user, or the like, may be maintained, while only its structure may be changed. Therefore, when the operator moves to another infrastructure, such data may be backed up.

In addition, the established app store 100 may be supported by the mall integration server 200 to perform a version update. For example, when the operator connects to the mall integration server 200 through the client 400 that operates the app store 100, the mall integration server 200 may compare version information of store package of the client 400 with currently supported version information, and may notify a version update when the version information of store package of the client 400 corresponds to a low version. Alternatively, the mall integration server 200 may automatically notify a new version to each app store 100 through a push service. Then, the client 400 may internally perform the version update of previously installed store package according to the notification of the mall integration server 200, and provide its update information to the operator.

Figure 10:
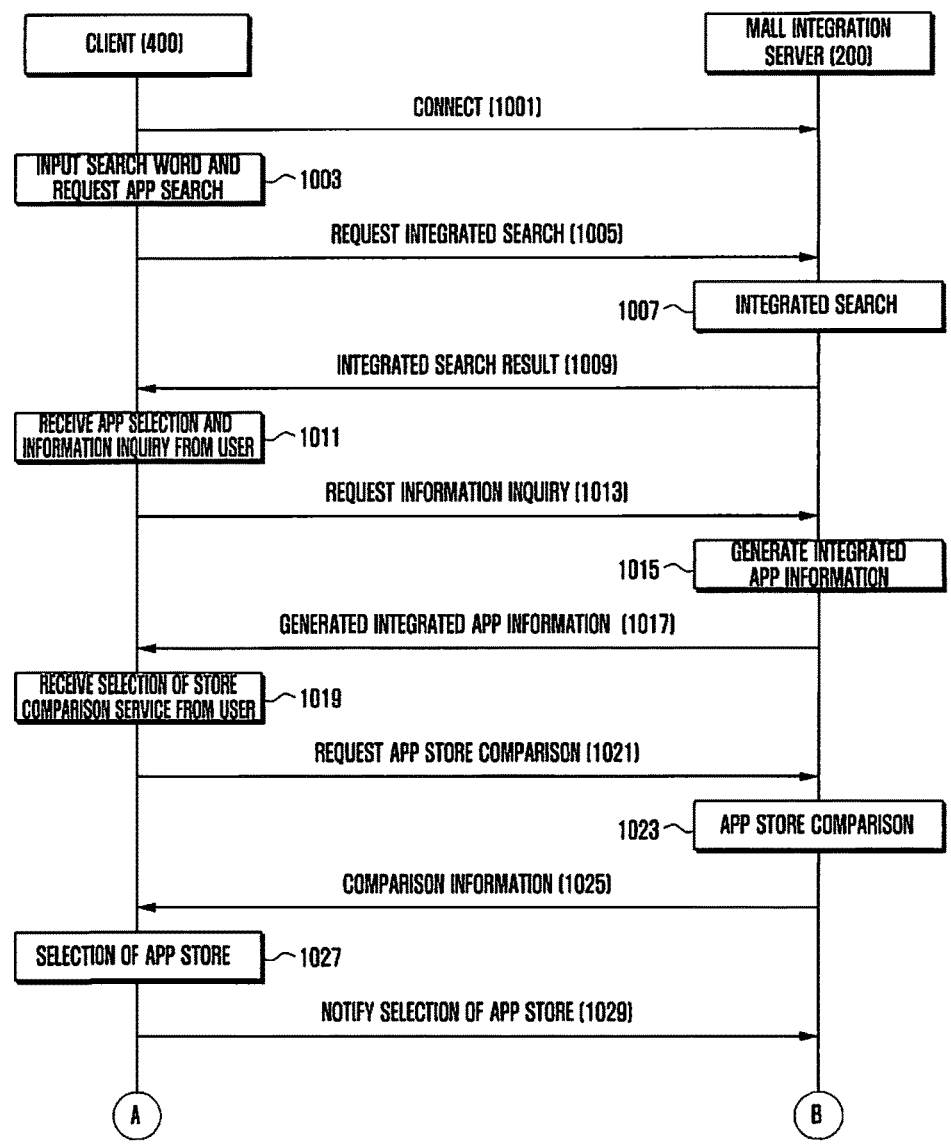
FIGS. 10 and 11 are flowcharts illustrating an app purchasing operation by using an app store service according to an embodiment of the present invention.
Figure 11:
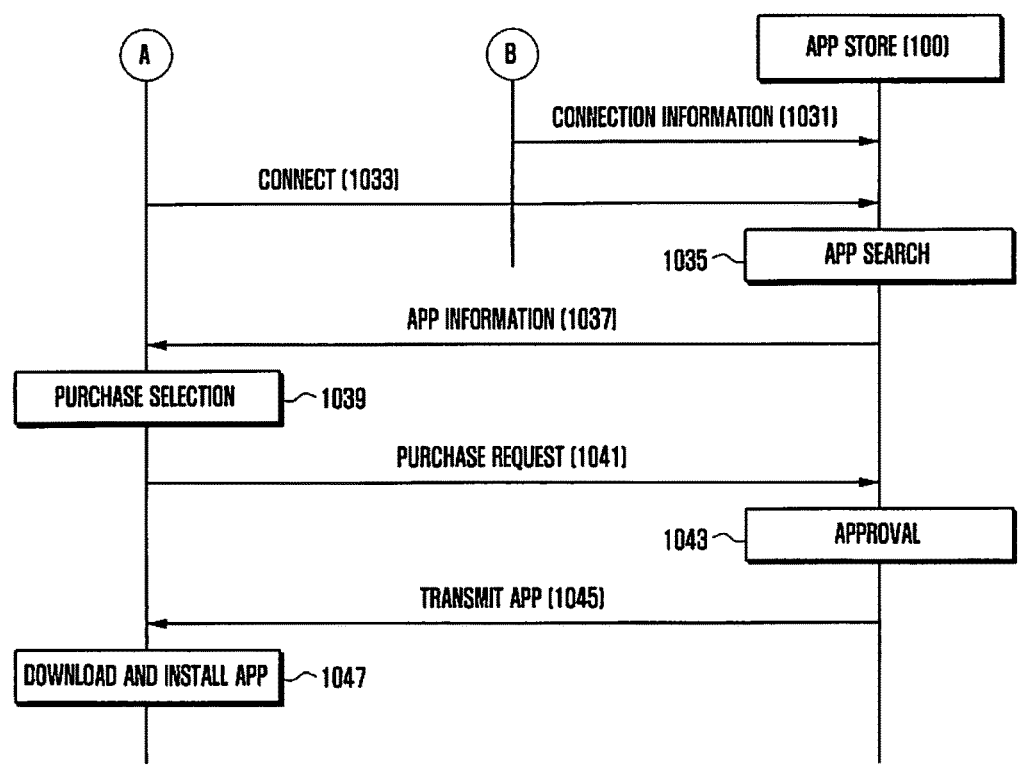

FIGS. 10 and 11 are flowcharts illustrating a method for providing an app store service according to an embodiment of the present invention.

In particular, FIGS. 10 and 11 illustrate an operation of integrally searching an app by the client 400 through the mall integration server 200, and purchasing the searched app. At this time, since the app store 100 may be operated by itself based on an independent purchaser UI, a purchaser may directly access to each individual app store 100 to perform a search and purchase of app. However, since a user cannot find out numerous app stores 100 one by one, the present invention performs an integrated search for the app stores 100 and the app through the purchaser UI provided by the mall integration server 200, and purchase the app by using the searched integrated information.

Referring to FIG. 10 and FIG. 11, firstly, the client 400 may be connected to the mall integration server 200 in response to the user request at step 1001. For example, the user client 400 may request a connection to the mall integration server 200 by inputting an address of the mall integration server 200 or selecting an app to connect to the mall integration server 200 through a screen interface supported by the client 400. Then, the client 400 may perform the connection to the mall integration server 200 through the inputted address or the address linked to the app in response to the request of user. At this time, the client 400 may further perform procedures, such as an authentication (e.g., input log information, etc) of the user, after connecting to the mall integration server 200.

Next, when a user inputs a search word for a desired app to request an app search by a corresponding search word at step 1003, the client 400 may request an integrated search for the app on the basis of the search word at step 1005. For example, the user may request the input and search of the search word for the app search based on the purchaser UI provided from the mall integration server 200 by using the client 400. At this time, the user may omit the app search request by the search word input and may directly perform a request of integrated search that requests an app of all app stores and a relevant metadata through a given UI. In addition, the search word may be a search word that refers to a name of a specific app, or a generic search word such as a category (e.g., a game, a social contents, an e-book, a shopping, a media, a finance, a transportation, etc.) related to the app to be searched, a popular app, a free app, and the like.

Next, when receiving the search word based app search request transmitted from the client 400, the mall integration server 200 may perform the integrated search for the app on the basis of the search word at step 1007. In addition, the mall integration server 200 may provide the integrated search result searched according to the integrated search for the app to the client 400 at step 1009. The mall integration server 200 may synchronize the app of all distributed app stores and the metadata relating to the app with each app store 100 to search the app that user requested to search in an integrated storage unit. In addition, the mall integration server 200 may transmit the integrated search result to the client 400 to provide to the user. In particular, when providing the integrated search result, the mall integration server 200 may provide the integrated search result which is filtered for only the app that can be supported based on the platform of the client 400. That is, the mall integration server 200 may identify the supported platform of the client 400, and may filter the app available in the client 400 among the integrated search result. The filtering may be performed for the apps according to the integrated search result with reference to supportable client platform information specified by an app seller.

In addition, the mall integration server 200 may provide the integrated search result which is filtered based on the supportable platform of the client 400 to the client 400. Accordingly, from the user's point of view, a cumbersome procedure such as an installation and deletion of unnecessary app which is not supported by client 400 may be previously prevented. Alternatively, the above mentioned filtering may be selectively provided, and it is obvious that the integrated search result for all apps which are not filtered may also be provided according to user selection.

Next, when receiving the integrated search result from the mall integration server 200, the client 400 may display the received integrated search result through a given screen interface UI, and may receive an app selection and information inquiry from user at step 1011. That is, the user of client 400 may inquire the integrated search result transmitted from the mall integration server 200, and select any one app that user desires to purchase/identify among the transmitted integrated search result to request information inquiry. Then, the client 400 may request the information inquiry for the app according to user selection to the mall integration server 200 at step 1013.

Next, the mall integration server 200 may inquire the information for the app requested from the client 400, and generate corresponding integrated app information at step 1015. In addition, the mall integration server 200 may provide the generated integrated app information to the client 400 at step 1017. That is, the mall integration server 200 may collect and integrate the information distributed in all app stores 100 with respect to a corresponding requested app, in response to the app information inquire request of the client 400 user, and provide the collected and integrated information to the client 400.

Next, when receiving the integrated app information from the mall integration server 200, the client 400 may display the received integrated app information through a given screen interface UI, and receive a selection of store comparison service for an app store comparison from user at step 1019. Then, the client 400 may request the app store comparison for the previously selected app to the mall integration server 200 in response to the user's selection of store comparison service at step 1021. For example, the client 400 user may request the comparison of information related to all app stores 100 selling a corresponding app in order to select one of the app stores 100 which actually sell the app, after reading basic app information provided by the mall integration server 200.

Next, the mall integration server 200 may search and gather the app store that sells the app among the distributed app stores 100, and perform a comparison for those app stores, in response to the request of app store comparison at step 1023. Further, the mall integration server 200 may transmit the comparison information for the app store 100 comparison to the client 400 at step 1025.

Next, when receiving the comparison information from the mall integration server 200, the client 400 may display the received comparison information through the given screen interface UI, and receive a selection of specific app store 100 from user at step 1027. That is, after reading sales information such as a list of all app stores 100 that sell the previously selected app and a price of the app sold in those app stores, the client 400 user may select any one app store 100.

Next, when a specific app store 100 is selected by user, the client 400 may notify the selection of app store 100 to the mall integration server 200 at step 1029. Then, the client 400 may connect to the selected app store 100 at step 1033. Here, the client 400 may request information related to the app to the connected app store 100. That is, when connecting to the app store 100, the client 400 may automatically request the app information within the app store 100 selected by the user. Here, the mall integration server 200 may identify the app store 100 selected in response to the selection of app store 100, and may transmit connection information such as information related to the client 400 and the app requested by the client 400, or the like to the identified app store 100 at step 1031.

Next, when the client 400 is connected, the app store 100 may perform a search for app based on the correspondingly transmitted connection information at step 1035. At this time, the search may correspond to a search within the app store 100. In addition, the app store 100 may provide the app information within the app store 100 in accordance with a search result to the client 400 at step 1037. That is, the app store 100 selected by the user of client 400 may perform an internal search for the app which is automatically requested to search at the time of the connection of the client 400, and provide the app information for the searched app to user through the client 400. At this time, depending on an implementation type, the app store 100 may move to the purchaser UI provided by the app store 100 to output it through the client 400.

Next, when receiving the app information from the app store 100, the client 400 may display it through the given screen interface UI, and receive a purchase selection for the app from user at step 1039. Then, the client 400 may transmit the purchase request for the app to the app store 100 is response to user's selection of app purchasing at step 1041. That is, the user of client 400 may identify the app information provided by the app store 100, and request a purchase of the app through the screen interface displayed through the client 400 when deciding the purchase of the app. In this case, the client 400 (or the app store 100) may check whether the requested app is installed in the client 400, and notify that the purchase request corresponds to an update, if the app has installed a previous version.

Next, when receiving the purchase request for the app from the client 400, the app store 100 may proceed an approval process in accordance with the app purchase at step 1043. For example, a process of a payment of user may be proceeded between the client 400 and the app store 100 when the app corresponds to a paid app, whereas a process of a download agreement of user may be proceeded between the client 400 and the app store 100 when the app corresponds to a free app. That is, the user of the client 400 may additionally proceed a certain approval process for the purchase of a corresponding app in the app store 100 selected by himself.

Next, when the approval process is completed, the app store 100 may transmit the app to the client 400 at step 1045. Then, the client 400 may download the app from the app store 100 to install in the client 400 at step 1047. At this time, when the client 400 downloads the user's purchase app (or when the app store 100 transmits the user's purchase app), an app which can be installed in the client 400 is selected to be downloaded (or transmitted) and installed, with reference to support platform information of the client 400. That is, an app (e.g., an app that can be installed and executed in an operating system of the client 400 and its version information) supported by the platform of the client may be selected to be downloaded (or transmitted) and installed.

Figure 12:
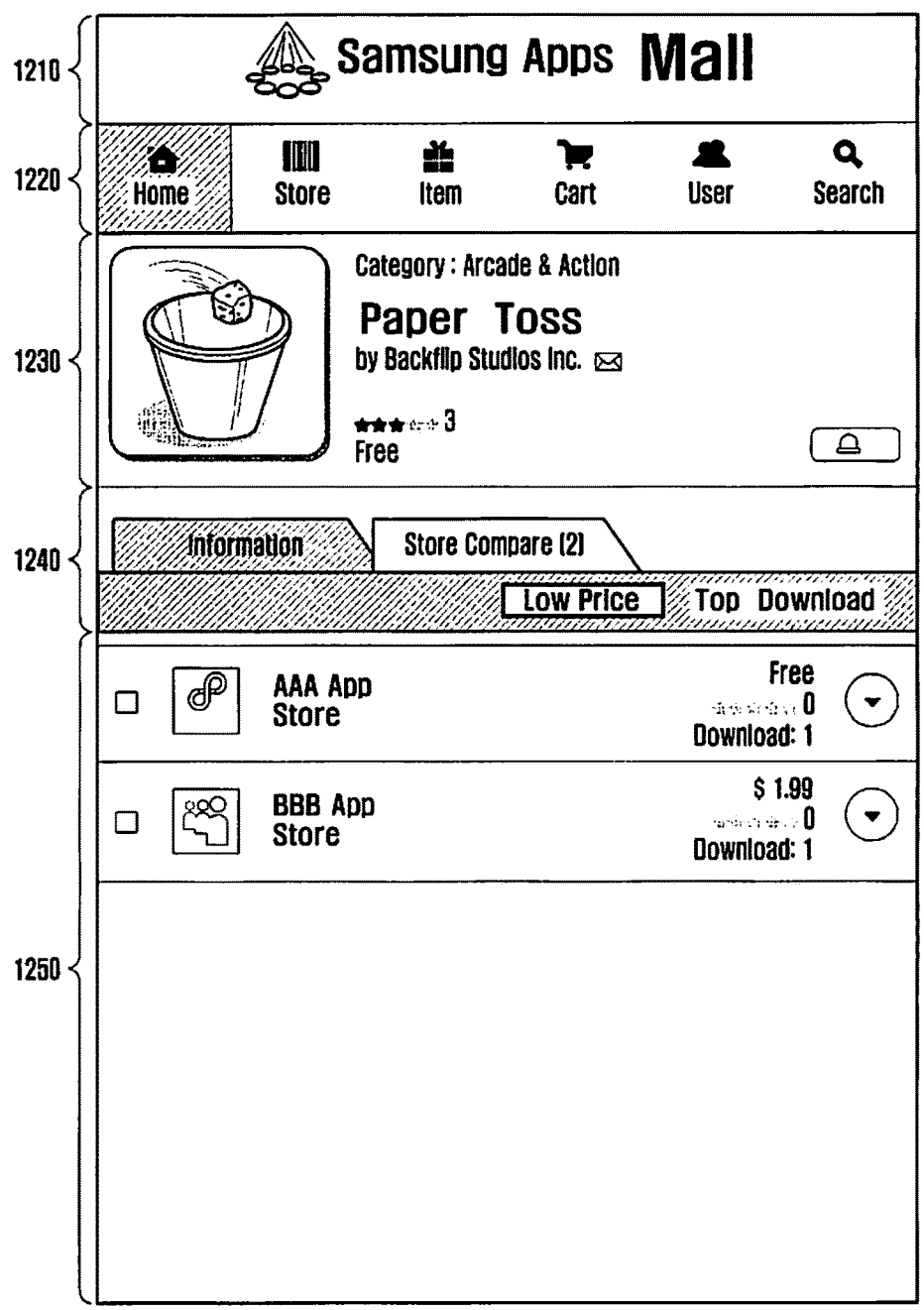
FIGS. 12 and 13 are diagrams illustrating an example of a screen interface that provides integrated statistics information on a use of app service of user through a client according to an embodiment of the present invention.
Figure 13:
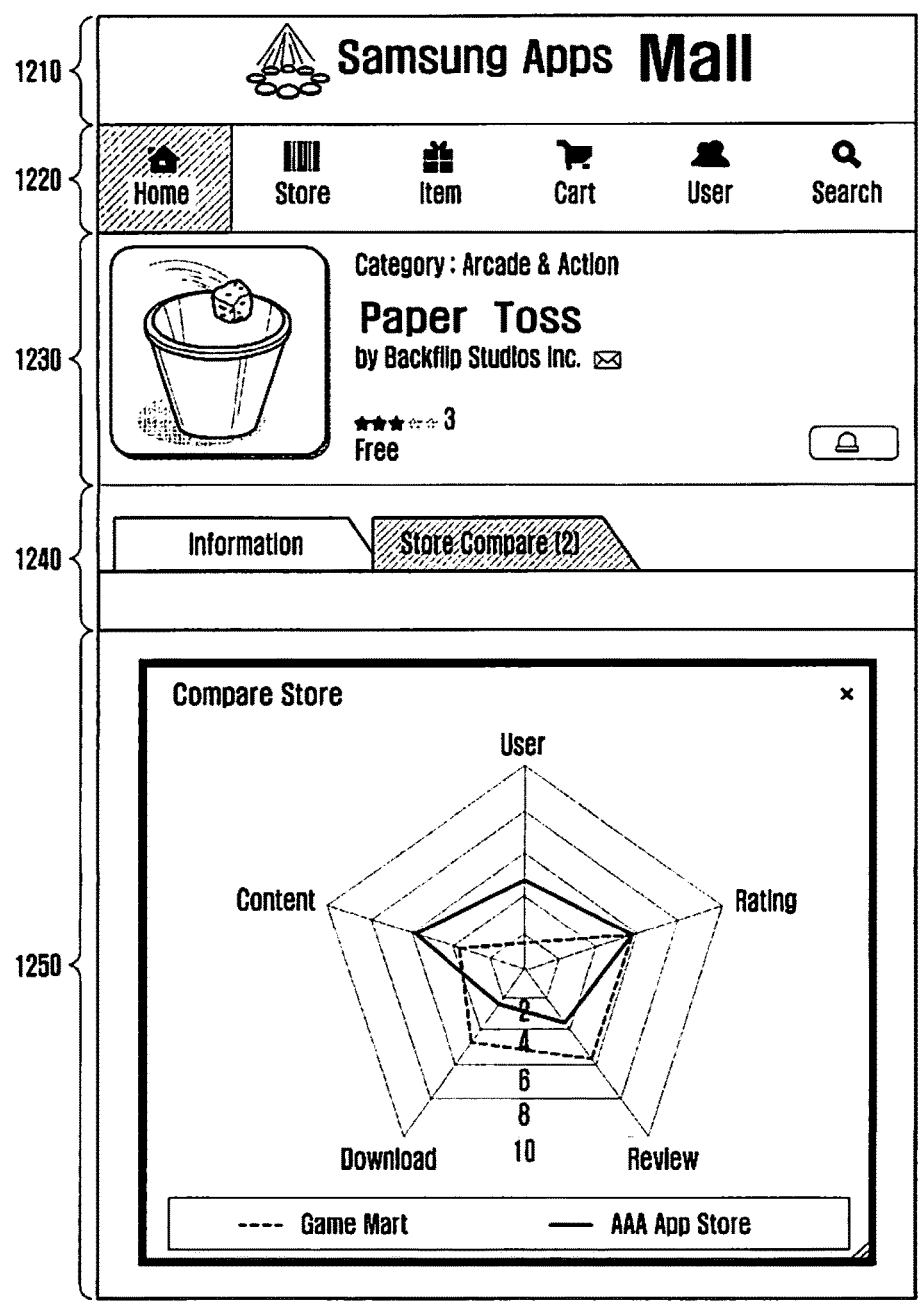

FIGS. 12 and 13 are diagrams illustrating an example of a screen interface that provides integrated statistics information on a use of app service of user through a client 400 according to an embodiment of the present invention.

Referring to FIG. 12 and FIG. 13, the screen interface UI for providing integrated statistics based information of the present invention may be configured to include an app store information area 1210 that displays information of currently connected to app store 100, a menu area 1220 that displays various menus provided by the app store 100, an app information area 1230 that displays app information (e.g., information related to a category of app, an app name, an app developer (manufacturer), free or paid, or the like) in accordance with user selection, a detailed menu area 1240 that displays menus for check detailed information for the app, and a detailed information area 1250 that displays detailed information in accordance with a detailed menu selected in the detailed menu area 1240, and the like.

Here, in the case of the detailed information area 1250, when the "Information" menu is selected from among the menus of the detailed menu area 1240, FIG. 12 illustrates an example of the "Information" menu. That is, as shown in reference number <1250> of FIG. 12, the detailed information of the "Information" menu may include information such as an app store list for at least one app store selling the app and a type (e.g., free, a certain price, the number of downloads, etc.) of selling a corresponding app, and an item for a sorting of the app store list (e.g., sorting by price, sorting by download, etc.), and the like. The user may connect to a corresponding app store by selecting any one app store among the app store list.

Further, in the case of the detailed information area 1250, when the "Store Compare" menu is selected from among the menus of the detailed menu area 1240, FIG. 13 illustrates an example of "Store Compare" menu. That is, as shown in reference number <1250> of FIG. 13, the statistics data for each app stores in the app store list may be compared, so that a graphically provided Graphical User Interface (GUI) may be displayed.

As described above, according to the embodiment of the present invention, in an environment in which the same app may be distributed to many app stores 100 to provide a service, the sales information statistics of all app stores 100 may be provided to each of the distributed independent app stores so that differentiated information may be provided. For example, integrated approval rate information, trust information of app through an approval/rejection status for an entire app store of the same app, integrated user evaluation information, app store operation information, and app store comparison index information through a visualization of operation statistics information (e.g., the number of users, sales performance, evaluation, or the like) of an individual app store may be provided. In addition, integrated app store information and app information may be provided with respect to the app according to user selection as described above, such that user's confidence in the app selection can be improved.

Figure 14:
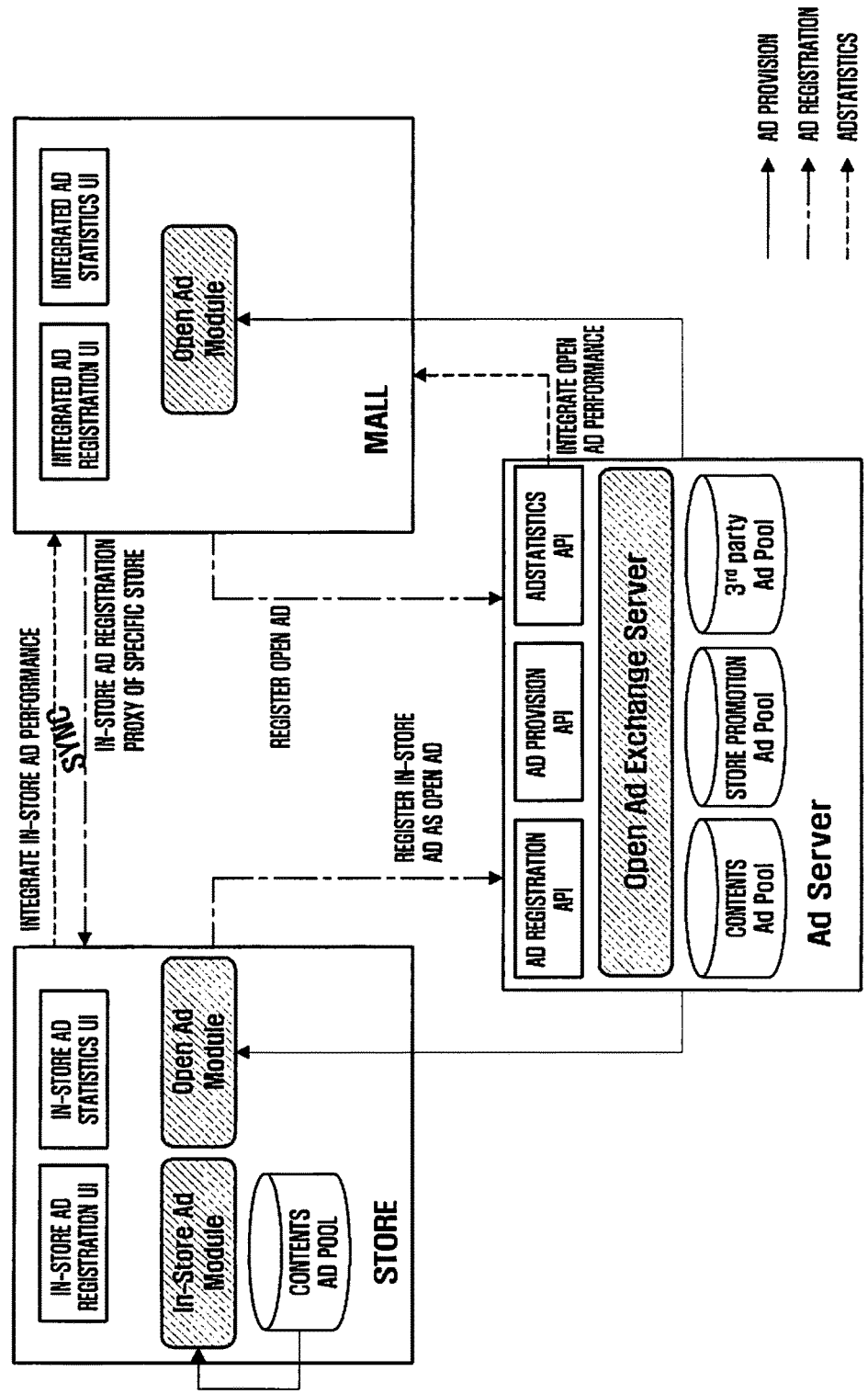
FIG. 14 is a diagram illustrating an example of grafting an app ad of an app store in an app store service system according to an embodiment of the present invention.

FIG. 14 is a diagram illustrating an example of grafting an app ad of an app store 100 in an app store service system according to an embodiment of the present invention.

Referring to FIG. 14, FIG. 14 illustrates an operation of providing an app ad in the app store 100 of present the invention. The app store 100 may independently operate an app ad server 900 to provide an app ad, or may provide an app ad of the app store 100 by using the app ad server 900 operated by the mall integration server 200.

First, when the app store 100 independently operates an app ad server 900, the app seller (or developer) may register an ad request with respect to the app that the app seller (or developer) registered in the app store 100. Then, the app store 100 may place the requested app ad in an ad inventory inside of a purchaser UI page of the app store 100. Further, when the ad placed in the ad inventory is selected, the app store 100 may move to an app information page in the purchaser UI page of the app store 100, and provide app information to a user who selected the ad.

Next, in the case of a method of using an external ad of the mall integration server 200, the mall integration server 200 or the store service platform 300 may provide the ad registered in an external (mall integration server 200, other app store, external ad pool, etc) to each individual distributed app store 100. In particular, in the case of the app currently sold in the app store, it is possible to move to an app information page within the purchaser UI page of the app store 100, such that user's breakaway from the app store 100 can be prevented, and purchase can be induced.

The foregoing method for providing a distribution-type app store service of the present invention may be implemented in a program command form executable by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, or flash memory for storing and executing program commands. Further, the program command includes a machine language code created by a compiler and a high-level language code executable by a computer using an interpreter. The foregoing hardware device may be configured to be operated according to at least one software module to perform an operation of the present invention, or software modules may be configured to be operated according to the hardware device.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:
1. An app store service system comprising:
a plurality of app stores established for distribution;
a mall integration server comprising a first processor that is configured to synchronize with each app store, integrally manage the establishment and integrated operation information collected from the each app store of the plurality of app stores, integrally analyze the information metadata collected from the plurality of app stores, and share operating information associated with an integrated application registered for the each app store in order to provide app integration search and information on the basis of the plurality of app stores; and a client device comprising a second processor that is configured to:
send a request to the mall integration server, wherein the request comprises a request for generating the integrated application,
perform integrated search and browsing for apps based on the integrated application, on the basis of the mall integration server and app stores,
wherein the integrated application is an app store application synchronized with the plurality of app stores through the mall integration server, and integrally manages information collected from the plurality of app stores.

2. The app store service system of claim 1, wherein the each of app stores is synchronized with the mall integration server by at least one of an installation type, a joining type, or an affiliation type provided by the mall integration server.

3. The app store service system of claim 2, wherein the affiliation type is provided by at least one of a method of interworking a previously operated existing app store with the mall integration server, or a method of integrating previously operated existing app stores by crawling.

4. The app store service system of claim 1, wherein the first processor of the mall integration server is further configured to provide to the client device such that a screen interface, a deliberation policy, a rate of profit distribution, and a recommendation policy are freely decided for each of the app stores.

5. The app store service system of claim 1, wherein the information is app related metadata, and
the first processor of the mall integration server is further configured to receives a request for establishing an integrated application to be linked with the each app store, establish the app store application, and registers an app in the established app store application.

6. The app store service system of claim 5, wherein the first processor of the mall integration server is further configured to identify the same app of the same app seller from among the plurality of app stores and integrates the identified data to synchronize.

7. The app store service system of claim 2, wherein the first processor of the mall integration server is further configured to provide search and inquiry for the plurality of app stores, search and inquiry for an app sold in the plurality of app stores, and sales information comparison including price comparison to the client device.

8. The app store service system of claim 1, wherein the mall integration server further comprises a store service platform to integrally analyze information collected from the each app store, and provides the integrally analyzed information to the each app store.

9. The app store service system of claim 8, wherein the store service platform integrally analyzes each item of metadata for the each app store collected through the mall integration server, and provides the analyzed integrated information to the each app store and the mall integration server as integrated statistics information.

10. The app store service system of claim 9, wherein the each app store and the mall integration server provide at least one of statistics information of approval/rejection status, entire user evaluation information for the same app, recommendation information including an app sold in another app store, or popular trend information of all users, based on the integrated statistics information.

11. The app store service system of claim 9, wherein the first processor of the mall integration server is further configured to provide a store comparison service to visualize and display statistics information including the number of users, sales performance, and evaluation for each of the plurality of app stores, based on the integrated statistics information to the client device.

12. The app store service system of claim 1, wherein the each app store further comprises an ad module to store and provide an ad for a selling app.

13. The app store service system of claim 1, wherein the first processor of the mall integration server further comprises an integrated ad module to integrate and store an ad of the each app store, and provide the integrated ad to other app stores.

14. The app store service system of claim 13, wherein the plurality of app stores moves and manages a provided ad as app information within its own app stores, when an ad of other app stores for an app sold in its own app stores is provided from the mall integration server.

15. The app store service system of claim 1, wherein the first processor of the mall integration server is further configured to recommend one of the plurality of app stores that can register a registration app requested by the client device and automatically register the requested app.

16. The app store service system of claim 15, wherein the first processor of the mall integration server is further configured to recommend by ranking the app stores through at least one of sales performance of app stores, suitability of existing sales app of app stores and the requested app, or suitability of preference of existing users of app stores and the requested app.

17. The app store service system of claim 1, wherein the first processor of the mall integration server is further configured to provide an integrated search result according to a support platform of the client device.

18. The app store service system of claim 1, wherein the second processor of the client device is further configured to download an app corresponding to the support platform of the client device, when downloading a purchase app from the app store or the mall integration server.

19. The app store service system of claim 1, wherein the first processor of the mall integration server is further configured to sort and provide an app corresponding to the support platform of the client, when providing an app that the client purchases.

* * * * *